(12) United States Patent
Tojo (10) Patent No.: US 11,037,014 B2
(45) Date of Patent: Jun. 15, 2021

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Hiroshi Tojo, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 275 days.

(21) Appl. No.: 15/954,044

(22) Filed: Apr. 16, 2018

(65) Prior Publication Data

US 2018/0300579 A1    Oct. 18, 2018

(30) Foreign Application Priority Data

Apr. 17, 2017 (JP) .............................. JP2017-081439

(51) Int. Cl.

| G06K 9/00 | (2006.01) |
|---|---|
| G06K 9/36 | (2006.01) |
| G06T 5/00 | (2006.01) |
| G06K 9/20 | (2006.01) |
| H04N 9/64 | (2006.01) |
| H04N 9/73 | (2006.01) |
| G06T 7/90 | (2017.01) |
| G06K 9/46 | (2006.01) |

(52) U.S. Cl.

CPC ........... G06K 9/36 (2013.01); G06K 9/00369 (2013.01); G06K 9/00771 (2013.01);

(Continued)

(58) Field of Classification Search

CPC ................ G06K 9/36; G06K 9/00369; G06K 9/00771; G06K 9/205; G06K 9/4652;

(Continued)

(56) References Cited

U.S. PATENT DOCUMENTS 8,320,634 B2 * 11/2012 Deutsch ................. A61B 90/94
382/103
10,638,058 B2 * 4/2020 Matsunaga ...... H04N 5/232127
(Continued)

FOREIGN PATENT DOCUMENTS

| JP | H08-037667 A | 2/1996 |
|---|---|---|
| JP | 2008-288706 A | 11/2008 |
| WO | 2014080613 A1 | 5/2014 |

OTHER PUBLICATIONS

Stauffer et al., "Adaptive Background Mixture Models for Real-Time Tracking," Proceedings of the 1999 IEEE computer Society Conference on Computer Vision and Pattern Recognition (Cat. NoPRO0149), IEEE Comput. Soc., vol. 2, Jun. 1999, pp. 246-252.

(Continued)

*Primary Examiner* — Shefali D Goradia
(74) *Attorney, Agent, or Firm* — Carter, DeLuca & Farrell LLP (57) ABSTRACT

With the present invention, it is possible to swiftly collect light source information for use when correcting color information of an object region in a captured image. A position in real space of an object included in a captured image is acquired, and light source information that corresponds to the acquired position is acquired. Color information of a region including the object in the captured image is corrected based on the acquired light source information.

14 Claims, 7 Drawing Sheets

(52) U.S. Cl.
CPC ......... *G06K 9/2054* (2013.01); *G06K 9/4652* (2013.01); *G06T 5/001* (2013.01); *G06T 7/90* (2017.01); *H04N 9/646* (2013.01); *H04N 9/73* (2013.01); *G06T 2207/10024* (2013.01); *G06T 2207/30232* (2013.01)

(58) Field of Classification Search
CPC ........................ G06T 7/90; G06T 5/001; G06T 2207/10024; G06T 2207/30232; H04N 9/646; H04N 9/73
See application file for complete search history.

(56) References Cited

U.S. PATENT DOCUMENTS

| | | |
|---|---|---|
| 2007/0237387 A1 | 10/2007 | Avidan et al. |
| 2010/0002071 A1* | 1/2010 | Ahiska ................... H04N 5/217 348/36 |
| 2012/0095926 A1* | 4/2012 | Nishimura ........... G06Q 10/103 705/301 |
| 2013/0044176 A1* | 2/2013 | Shirasaki ................... B41J 2/45 347/118 |
| 2013/0155247 A1* | 6/2013 | Wang ..................... H04N 9/735 348/159 |
| 2014/0139552 A1* | 5/2014 | Morinaga ............. G06T 19/006 345/633 |
| 2015/0348313 A1* | 12/2015 | Fuchikami .............. G06T 5/006 348/333.01 |
| 2016/0210728 A1 | 7/2016 | Tojo |
| 2016/0216515 A1* | 7/2016 | Bouchier ............. G06T 19/006 |
| 2016/0350967 A1* | 12/2016 | Klassen .................. G06T 15/60 |

OTHER PUBLICATIONS

Notice of Reasons for Refusal issued by the Japan Patent Office dated Feb. 19, 2021 in corresponding JP Patent Application No. 2017-081439, with English translation.

* cited by examiner

IMAGE PROCESSING APPARATUS, IMAGE PROCESSING METHOD, AND NON-TRANSITORY COMPUTER-READABLE STORAGE MEDIUM

BACKGROUND

Field

The present invention relates to image processing technology for processing images of objects.

Description of the Related Art

Conventionally, there is a system in which multiple cameras are installed in a convenience store, a shopping mall, an airport, or the like and are connected by a network to make it possible to monitor multiple sites. For example, there is a use mode in which current camera video is searched to find a specific person such as a shoplifter who appears in a recorded video that was captured in the recent past by a camera. At this time, by displaying the recorded video and current camera videos alongside each other and visually checking them, it is possible to find out which camera imaging range currently includes the specific person.

When visually identifying a specific person in multiple camera videos, it is difficult to correctly identify the person if colors are different between videos, and between person regions in particular. It is known that camera color reproduction is influenced by the color temperature of ambient light at the installation location. For example, when comparing a fluorescent lamp and an incandescent lamp, objects will be reproduced with more intense blues under the fluorescent lamp, and objects will be reproduced with more intense reds under the incandescent lamp. In view of this, the cameras perform color correction by white balance processing that employs video in the entire screen. In actuality, it is often the case that multiple light sources exist in the imaging range. For example, when shooting inside a room that has a window, a fluorescent lamp is a light source inside the room, and the sun is a light source outside the window. Under such conditions, the influence of the light source differs according to where a person stands, and therefore if the determination in the aforementioned white balance processing is made based on the entirety of the screen, colors pertaining to the person will not always be corrected correctly. In view of this, technology has been proposed for correctly performing color correction even where there are multiple light sources.

With the invention disclosed in Japanese Patent Laid-Open No. 8-37667, the screen is divided into blocks, and correction amounts are calculated for each block. Also, with the invention disclosed in Japanese Patent Laid-Open No. 2008-288706, the distance to an object (depth information) is detected for each block, and correction amounts are determined based on this depth information.

However, with the above-mentioned techniques, the correction amounts are associated with two-dimensional positions in a captured image. For this reason, if a person who is the imaging subject moves such that the positional relationship with the camera changes, it is necessary to again measure (or estimate) the light source that influences the imaging subject, and calculate correction amounts. It is necessary to again measure (or estimate) the light source and calculate correction amounts also when there is a change in circumstances, such as a change in the camera angle of view, a change in the installation position, or the addition of a new camera.

SUMMARY

According to an aspect of the present invention, there is provided an image processing apparatus comprising: a holding unit configured to hold a position in real space and light source information regarding a light source in correspondence with each other; an acquisition unit configured to acquire a position in real space of an object included in a captured image, and acquire light source information that corresponds to the acquired position from the holding unit; and a correction unit configured to correct color information of a region including the object in the captured image based on the light source information acquired by the acquisition unit.

Further features of the present invention will become apparent from the following description of exemplary embodiments with reference to the attached drawings.

DESCRIPTION OF THE EMBODIMENTS

Hereinafter, an embodiment of the present invention will be described with reference to the accompanying drawings. Note that the embodiment described below shows an example of specifically carrying out the present invention, and thus is one specific embodiment of a configuration described in the claims.

First Embodiment

The present embodiment describes an example of a system that has multiple image capturing devices, and in this system, color information of an object in a captured image from an image capturing device of interest is corrected based on light source information that corresponds to the position in real space of the object before the captured image is presented to a user. Note that although the object is a human in the following description, there is no limitation to this, and the following description is similarly applicable to cases where the object is not a human.

Figure 1:
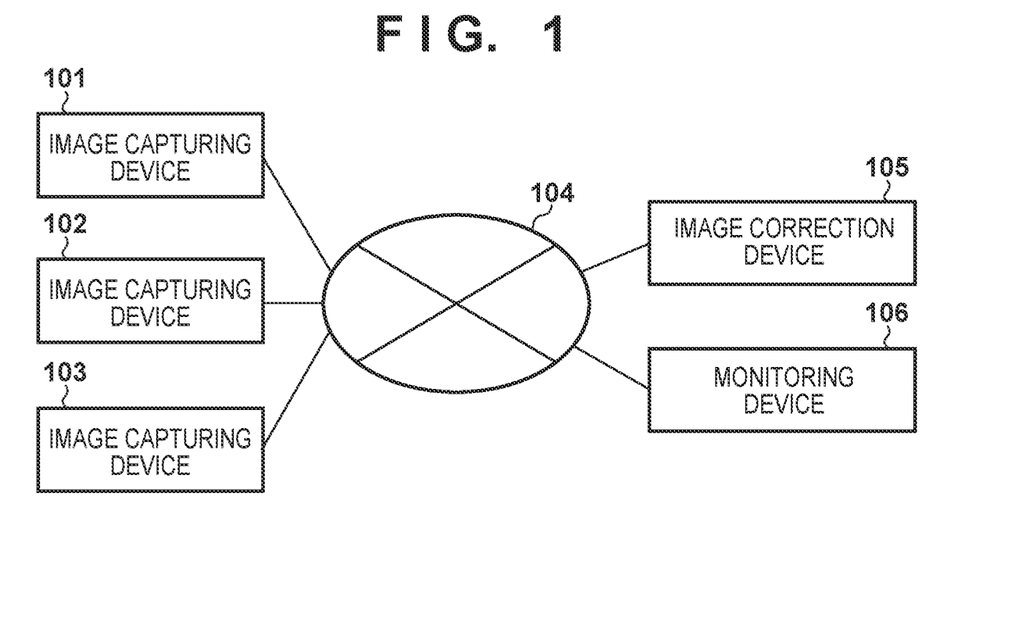
FIG. 1 is a block diagram showing an example of a configuration of a system.

First, an example of the configuration of the system according to the present embodiment will be described with reference to the block diagram of FIG. 1. As shown in FIG. 1, the system according to the present embodiment has image capturing devices 101 to 103, an image correction device 105 as an image processing apparatus, and a monitoring device 106. The image capturing devices 101 to 103, the image correction device 105, and the monitoring device 106 are each connected a network 104 such as an LAN or the Internet, and are configured to be capable of performing data communication with each other.

First, the image capturing devices 101 to 103 will be described. The image capturing devices 101 to 103 are provided so as to captures images of various locations in real space, and thus are each arranged at a different location in real space and capture moving images or successively capture still images in real space. The frame images (captured images) captured by the image capturing devices 101 to 103 are all transmitted to the image correction device 105 via the network 104. The image capturing devices 101 to 103 each have an imaging sensor such as a CCD or a CMOS, an imaging lens, and the like. Although there are three image capturing devices in FIG. 1, the number of image capturing devices is not limited to being three.

Next, the image correction device 105 will be described. The image correction device 105 performs processing for correcting color information of an object in captured images, which have been received from the image capturing devices 101 to 103, in accordance with light source information that corresponds to the position in real space of the object. The captured images corrected by the image correction device 105 are transmitted to the monitoring device 106. An example of the function configuration of the image correction device 105 is shown in the block diagram of FIG. 3. The operations of the function units shown in FIG. 3 will be described later.

Next, the monitoring device 106 will be described. The monitoring device 106 is a device for displaying captured images of an object in which color information has been corrected by the image correction device 105, in order to present the captured images to a user.

Figure 4:
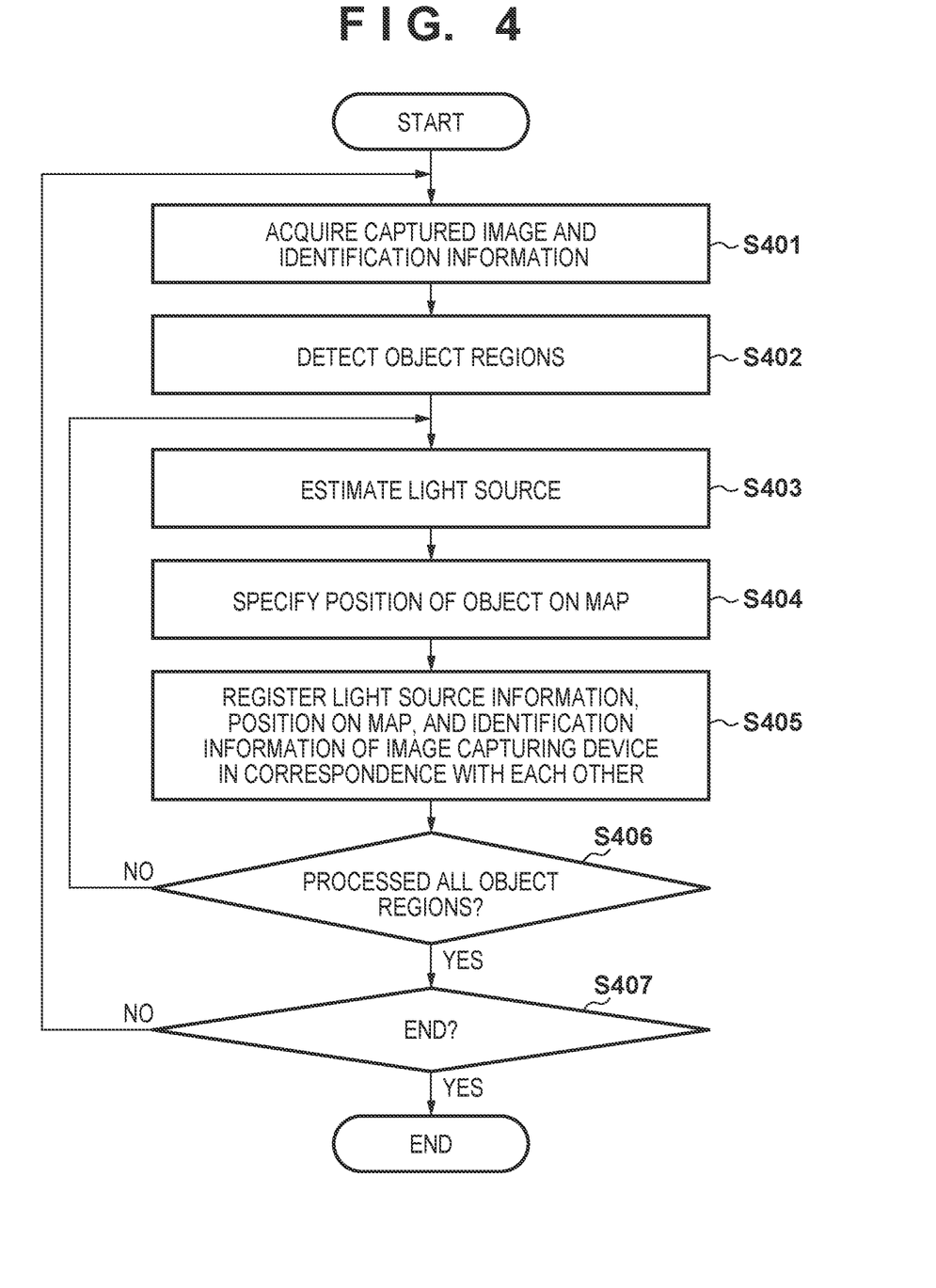
FIG. 4 is a flowchart of light source map information generation processing.

Next, light source map information generation processing, which is performed at a timing such as when the image capturing devices are installed before operation of the system according to the present embodiment, will be described with reference to the flowchart of FIG. 4. FIG. 4 is a flowchart of processing performed by the image correction device 105 in order to generate light source map information, which is information used by the image correction device 105 to correct color information of an object in captured images. This light source map information is generated for each of the image capturing devices 101 to 103. Processing corresponding to the flowchart of FIG. 4 is processing for the generation of light source map information with respect to one image capturing device, and therefore in the case of the present embodiment, processing corresponding to the flowchart of FIG. 4 is performed for each of the image capturing devices 101 to 103. In the case of correcting color information of an object in a captured image obtained by the image capturing device 101, the light source map information that was generated for the image capturing device 101 is applied. Also, in the case of correcting color information of an object in a captured image obtained by the image capturing device 102, the light source map information that was generated for the image capturing device 102 is applied. Furthermore, in the case of correcting color information of an object in a captured image obtained by the image capturing device 103, the light source map information that was generated for the image capturing device 103 is applied.

Processing for generating light source map information for the image capturing device 101 will be described below, but the same applies to processing for generating light source map information for the image capturing device 102 and processing for generating light source map information for the image capturing device 103 as well.

In step S401, an acquisition unit 301 receives a captured image and identification information of the image capturing device 101, which were transmitted from the image capturing device 101 via the network 104.

In step S402, a detection unit 302 detects regions that include an object (object regions) in the captured image that was received in step S401. The object regions are each indicated by the x coordinates and y coordinates of two points, namely the upper left and lower right points of a rectangle that surrounds the object, with the upper left corner of the captured image serving as the origin, for example. Furthermore, a mask image in which "1" is assigned to pixels that constitute the object and "0" is assigned to the other pixels may additionally be provided. By using this mask image, it is possible to distinguish between object pixels and non-object pixels that are included due to expressing the object region with a rectangle.

The method described in Document 1 noted below is an example of a specific method for detecting an object region in a captured image. Specifically, there is a method employing background subtraction, in which a background model is generated based on a captured image in which only the background is shot in advance, and an object region is detected based on the difference between the background model and an input image (here, the captured image received in step S401).

Document 1: Stauffer C, Grimson W. E. L. Adaptive background mixture models for real-time tracking. In Proceedings. 1999 IEEE Computer Society Conference on Computer Vision and Pattern Recognition (Cat. NoPRO0149). IEEE Comput. Soc. Part Vol. 2, 1999

The method described in Document 2 noted below is an example of another technique for detecting an object region in a captured image. Specifically, a detection window having a predetermined size is scanned on an input image (here, the captured image received in step S401), and "human or not" two-class discrimination is performed with respect to a pattern image obtained by cutting out the image in the detection window. In this discrimination, a discriminator is configured by effectively combining many weak discriminators with use of AdaBoost, thus improving the discrimination precision. Also, a cascade detector is configured by connecting multiple of such discriminators in series. The weak discriminators are configured by HOG feature values. The cascade detector first uses an early-stage simple discriminator to perform on-the-spot elimination of pattern candidates that are clearly not the object. Then only the other candidates are subjected to the "human or not" discrimination by a later-stage complex discriminator that has a higher identification performance.

Document 2: US-2007-0237387

As described above, the object is a human in the present embodiment, but in the case of a desire to treat a vehicle as the object, it is sufficient to create the discriminator in Document 2 for a vehicle. By using the methods described above, it is possible to detect an object region in a captured image. Note that the technique for detecting an object region in a captured image is not limited to a specific technique, and any technique may be employed.

In step S403, an estimation unit 305 selects, as a selected object region, one not-yet-selected object region that was detected in step S402 in the captured image received in step S401. The estimation unit 305 then performs light source estimation using the pixel values in the selected object region, thus estimating light source information that corresponds to the position in real space of the object in the selected object region.

As one example of a method for estimating "light color of light source corresponding to position in real space of object in selected object region" as the light source information, it is possible to estimate that a region in which the luminance value is a predetermined value or more in the selected object region is white, and estimate that a color near the white position in the color space (color difference space) is the light color of the light source. The method described in Patent Document 1 is an example of a method for estimating "color temperature indicating light color of light source corresponding to position in real space of object in selected object region" as the light source information. Specifically, an object color is modeled for various color temperatures, the degree of reliability for the extent to which the object color exists in the selected object region is determined based on the number of pixels, and a color temperature having a higher degree of reliability is selected.

In step S404, a specification unit 303 uses a transformation matrix that has been created in advance for the image capturing device 101 and registered in a storage unit 304 to transform the position of the selected object region in the captured image received in step S401 so as to obtain a corresponding position in real space. In the present embodiment, the aforementioned "transformation matrix that has been created in advance for the image capturing device 101 and registered in the storage unit 304" is a transformation matrix for converting a position in a captured image obtained by the image capturing device 101 into a corresponding position on a map of the monitoring area. The map of the monitoring area is an overhead view of the area in which the image capturing devices 101 to 103 are disposed, and is an overhead view of the entirety of an area that includes the area monitored by the image capturing devices 101 to 103.

The aforementioned "transformation matrix that has been created in advance for the image capturing device 101 and registered in the storage unit 304" is obtained as described below, for example. Specifically, a plane on the floor in a captured image obtained by the image capturing device 101 is designated in advance during installation of the image capturing device 101, a corresponding plane in the map is designated, and a nomography matrix for the two designated planes is obtained as the aforementioned transformation matrix. This transformation matrix is obtained in advance for each of the image capturing devices 101 to 103, and these transformation matrices are registered in the storage unit 304 in correspondence with identification information of the image capturing devices.

Accordingly, in step S404, the specification unit 303 reads out the transformation matrix that is registered in the storage unit 304 in correspondence with the identification information of the image capturing device 101. The specification unit 303 then transforms the position of the selected object region in the captured image received in step S401 into a corresponding position on the map with use of the transformation matrix that was read out. If the central coordinate position of the bottom side of the selected object region is set as the position of the selected object region in the captured image for example, the position of the object's feet in the captured image can be transformed into a position on the map.

In step S405, a generation unit 306 registers, in the storage unit 307, the light source information estimated by the estimation unit 305 in step S403, the position on the map specified by the specification unit 303 in step S404, and the identification information of the image capturing device 101 acquired by the acquisition unit 301 in step S401, in correspondence with each other.

In step S406, the estimation unit 305 determines whether or not a not-yet-selected object region remains among the object regions that were detected in step S402 in the captured image received in step S401. If the result of this determination is that a not-yet-selected object region remains among the object regions that were detected in step S402 in the captured image received in step S401, the processing returns to step S403. On the other hand, if all of the object regions that were detected in step S402 in the captured image received in step S401 have been selected as the selected object region, the processing moves to step S407.

In step S407, a control unit 300 determines whether or not an end condition for ending the processing corresponding to the flowchart of FIG. 4 has been satisfied. For example, in the case where images are captured by the image capturing devices 101 to 103 for a given time, and then the processing of steps S401 to S406 is performed, it is determined that the end condition has been satisfied if the given time has elapsed since the start of image capturing by the image capturing devices 101 to 103. If the result of this determination is that the end condition has been satisfied, the processing corresponding to the flowchart of FIG. 4 is complete. On the other hand, if the end condition has not been satisfied, the processing returns to step S401.

By performing the processing corresponding to the flowchart of FIG. 4 for the image capturing device 101, a set of identification information of the image capturing device 101, the position of the object region in the captured image obtained by the image capturing device 101 on the map, and light source information corresponding to the position is registered in the storage unit 307. This set of information is light source map information that corresponds to the image capturing device 101.

Similarly, by performing the processing corresponding to the flowchart of FIG. 4 for the image capturing device 102, a set of identification information of the image capturing device 102, the position of the object region in the captured image obtained by the image capturing device 102 on the map, and light source information corresponding to the position is registered in the storage unit 307. This set of information is light source map information that corresponds to the image capturing device 102. Also, by performing the processing corresponding to the flowchart of FIG. 4 for the image capturing device 103, a set of identification information of the image capturing device 103, the position of the object region in the captured image obtained by the image capturing device 103 on the map, and light source information corresponding to the position is registered in the storage unit 307. This set of information is light source map information that corresponds to the image capturing device 103.

According to this processing, each time an object moves in the monitoring area, it is possible to acquire light source information that corresponds to the position of the object in each instance. If the processing in the flowchart of FIG. 4 is repeatedly performed for the image capturing devices 101 to 103 for a sufficient amount of time, it can be expected that the object will move in the monitoring area during that time, and therefore light source map information can be generated for the entirety of the imaging ranges of the image capturing devices 101 to 103 on the map.

Figure 5:
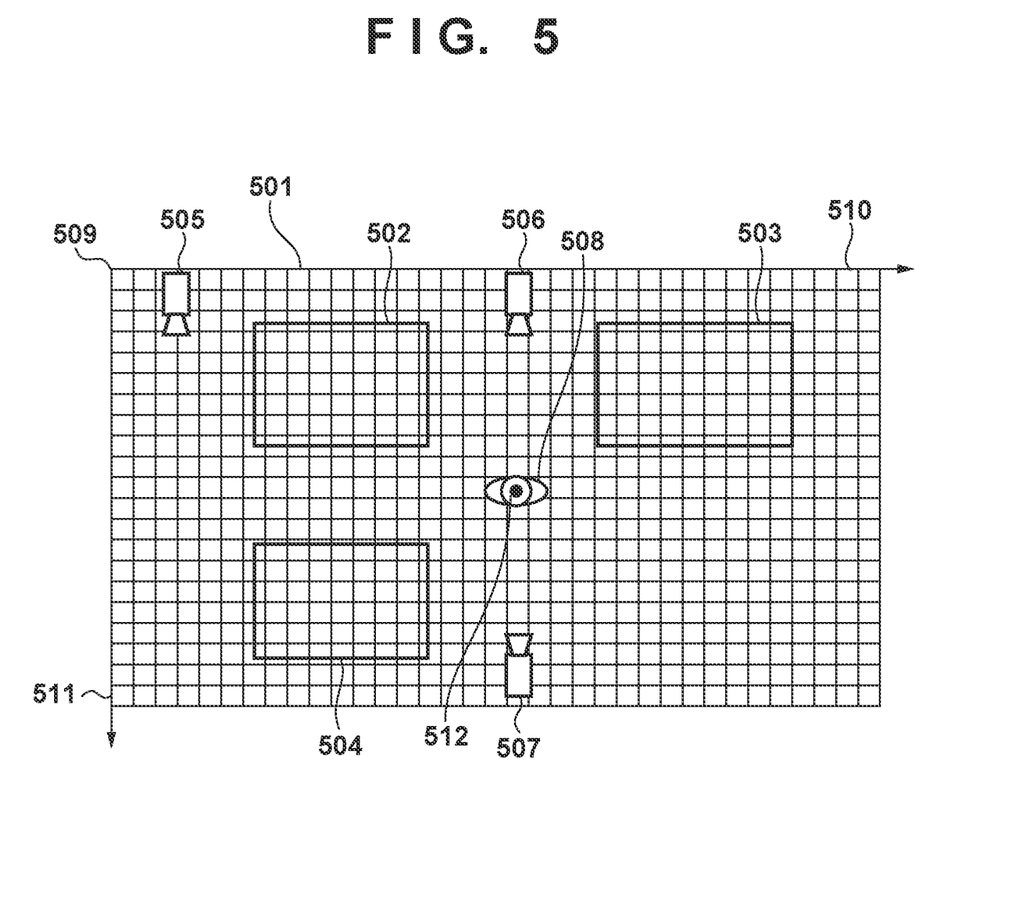
FIG. 5 is a diagram illustrating light source map information.

The light source map information will be described below with reference to FIG. 5. FIG. 5 shows a map 501 of a monitoring area in which image capturing devices 505 to 507 are arranged, and the image capturing devices 505 to 507 are arranged in passages between rooms 502 to 504 that are surrounded by walls. Also, in this map 501, an upper left corner position 509 serves as the origin, an x axis 510 is defined in the horizontal direction, and a y axis 511 is defined in the vertical direction.

Here, it is assumed that an object 508 is located at a position 512 on the map 501 at a certain point in time. In this state, if it is assumed that light source information for the object 508 is obtained from a captured image obtained by the image capturing device 507 for example, a set of this light source information, the position 512, and identification information of the image capturing device 507 will be registered in the storage unit 307 as "light source map information for the image capturing device 507".

Note that in the case where the map 501 is divided into blocks as shown in FIG. 5, the position 512 may be the position of the block that includes a position obtained by transformation using a transformation matrix, or may be identification information of that block (identification information given in the raster scan order). By changing the number of block divisions, it is possible to control the amount of memory used by the light source map information, and it is also possible to achieve an increase in speed when referencing the light source map information in later-described correction processing.

In this way, by registering positions of the object on the map in correspondence with light source information, even if the light source, which influences the object color, changes due to movement of the object, it is possible to read out appropriate light source information as necessary.

Also, in addition to light source information, identification information of the image capturing device is also registered in correspondence with the position of the object on the map, thus making it possible to handle the case of different light sources that influence the object color due to different imaging directions. In the example in FIG. 5, the object 508 can be imaged by both the image capturing device 507 and the image capturing device 506. At this time, it is assumed that a 3000 K light source is installed on the image capturing device 507 side, and a 2500 K light source is installed on the image capturing device 506 side, for example. Even in this situation, different light source information for the image capturing devices 506 and 507 can be stored for the same position 512. The sets of light source information that correspond to the identification information of the image capturing devices can be read out as necessary.

Figure 6:
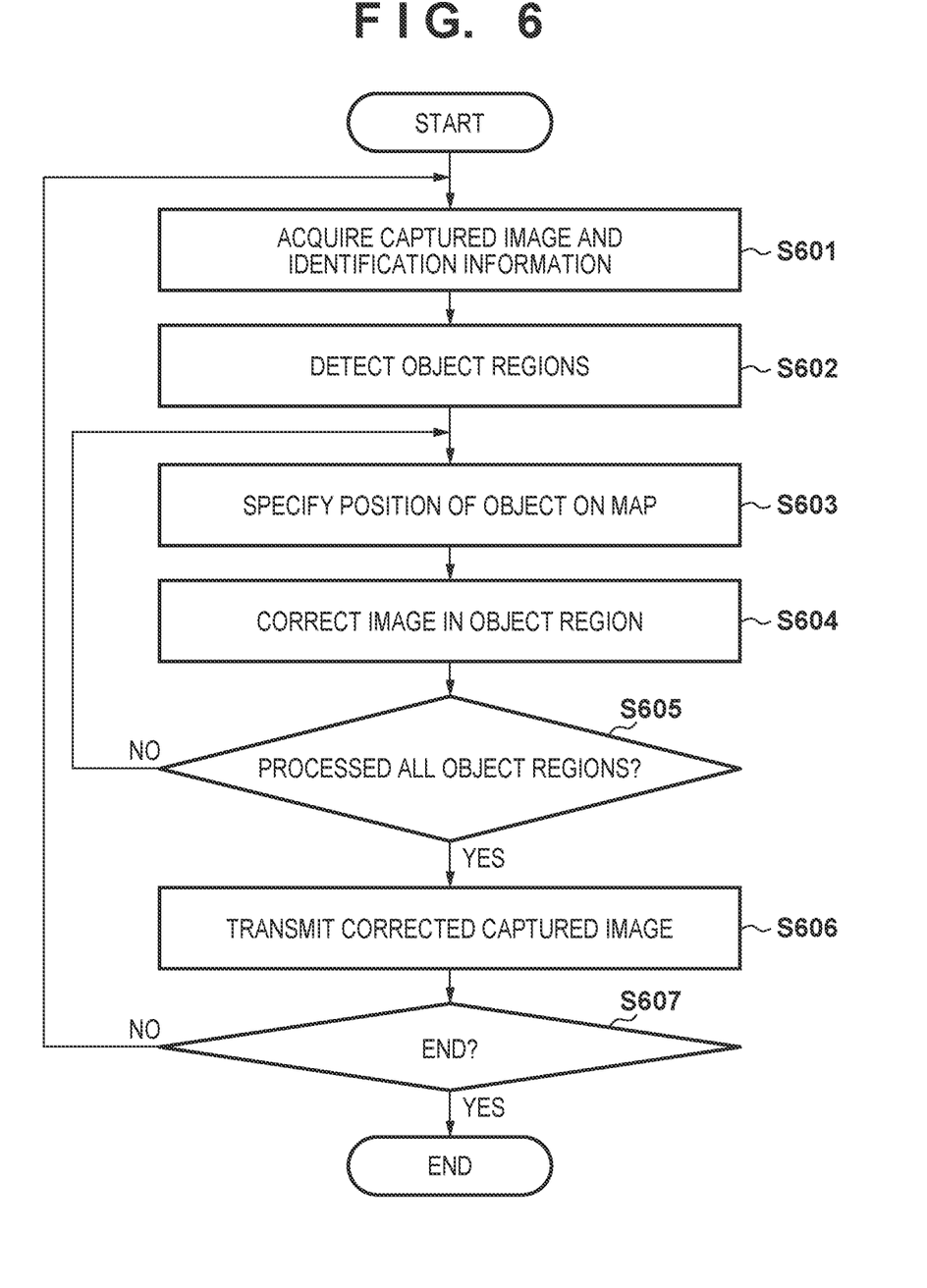
FIG. 6 is a flowchart of correction processing for correcting color information in an object region in a captured image.

Next, correction processing for correcting color information of an object region in a captured image with use of light source map information registered in the storage unit 307 will be described with reference to the flowchart of FIG. 6. Processing corresponding to the flowchart of FIG. 6 is processing for correcting an object region in a captured image from one image capturing device, and therefore in the case of the present embodiment, processing corresponding to the flowchart of FIG. 6 is performed for each of the image capturing devices 101 to 103. The processing in steps S601 and S602 is similar to that of steps S401 and S402 described above, and therefore descriptions will not be given for these steps.

In step S603, a correction unit 308 selects, as a selected object region, one not-yet-selected object region that was detected in step S602 in the captured image received in step S601. Then, similarly to the specification unit 303, the correction unit 308 uses a transformation matrix that has been created in advance for the image capturing device 101 and registered in the storage unit 304 to transform the position of the selected object region in the captured image received in step S601 so as to obtain a corresponding position on the map. The correction unit 308 specifies light source map information that includes the obtained corresponding position from among the sets of light source map information that include the identification information of the image capturing device 101, and reads out the light source information in the specified light source map information from the storage unit 307. If the corresponding position on the map indicates a block position/identification information, the light source map information that includes that block position/identification information is specified from among the sets of light source map information that include the identification information of the image capturing device 101, and the light source information in the specified light source map information is requested and read out (output) from the storage unit 307.

Then, in step S604, the correction unit 308 corrects color information of the selected object region based on the light source information that was read out from the storage unit 307. In the correction of color information in the selected object region, a look-up table for converting the values of the RGB channels is created for each one of predetermined color temperatures (or white point position coordinates in the color difference space), for example. Color information correction is then performed on the selected object region by changing the RGB values of pixels in the selected object region with use of the look-up table that corresponds to the color temperature (or the white point position coordinates in the color difference space) of the selected object region. Note that rather than merely indicating colors, the color information may indicate another element such as luminance.

In step S605, the correction unit 308 determines whether or not a not-yet-selected object region remains among the object regions that were detected in step S602 in the captured image received in step S601. If the result of this determination is that a not-yet-selected object region remains among the object regions that were detected in step S602 in the captured image received in step S601, the processing returns to step S603. On the other hand, if all of the object regions that were detected in step S602 in the captured image received in step S601 have been selected as the selected object region, the processing moves to step S606.

In step S606, the correction unit 308 transmits, to the monitoring device 106 via the network 104, the corrected captured image in which color information was corrected in step S604 for all object regions in the captured image that was received in step S601. Accordingly, a captured image in which color information has been corrected for all object regions is displayed in the display screen of the monitoring device 106. In this way, the object regions checked by the user in the captured images from each image capturing device have been subjected to correction that reflects light source information that corresponds to the position of the object in the monitoring area, thus making it possible to correctly identify clothing colors and the like.

In step S607, a control unit 300 determines whether or not an end condition for ending the processing corresponding to the flowchart of FIG. 6 has been satisfied. For example, it is determined that the end condition has been satisfied if an end instruction has been input from the user of the image correction device 105. If the result of this determination is that the end condition has been satisfied, the processing corresponding to the flowchart of FIG. 6 is complete. On the other hand, if the end condition has not been satisfied, the processing returns to step S601.

Figure 7A:
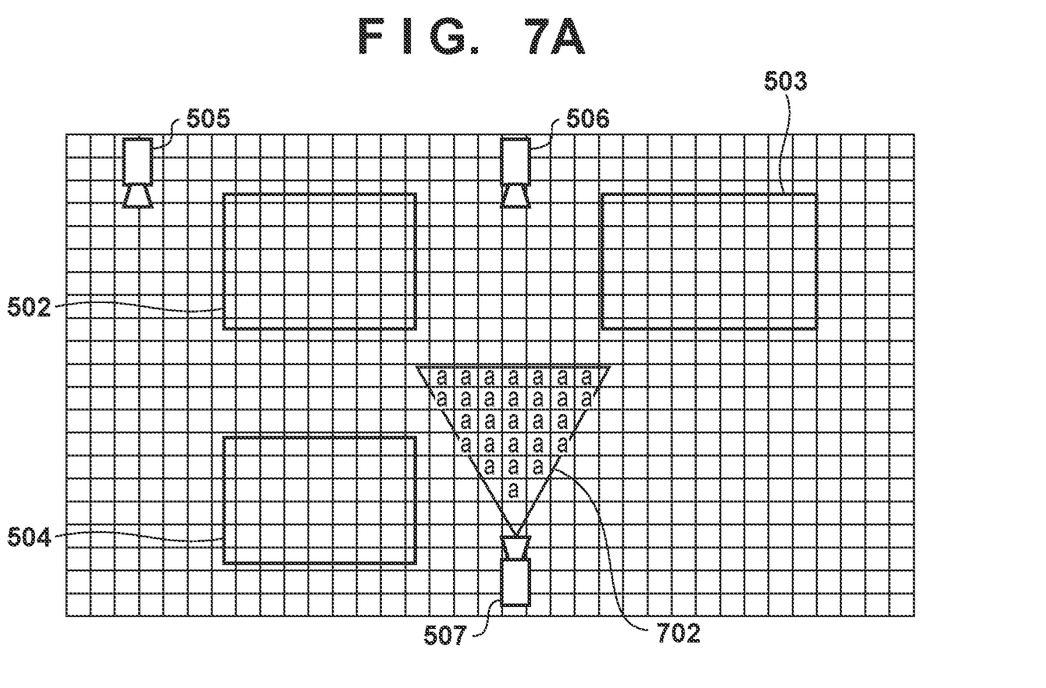
FIG. 7A is a diagram illustrating advantages of a first embodiment.
Figure 7B:
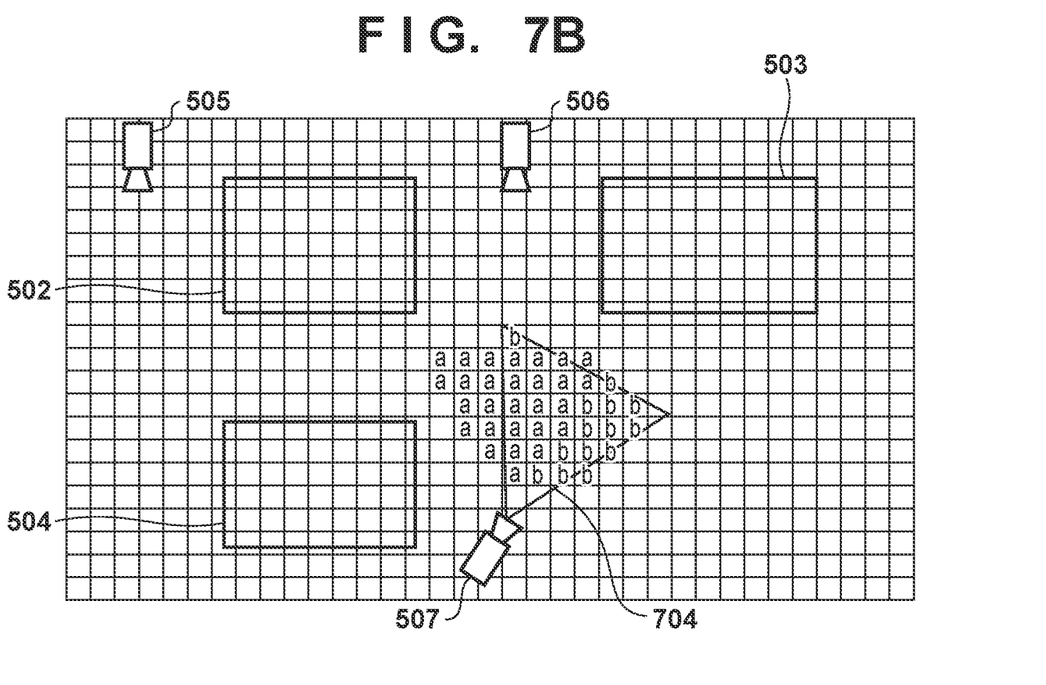
FIG. 7B is a diagram illustrating advantages of the first embodiment.
Figure 7C:
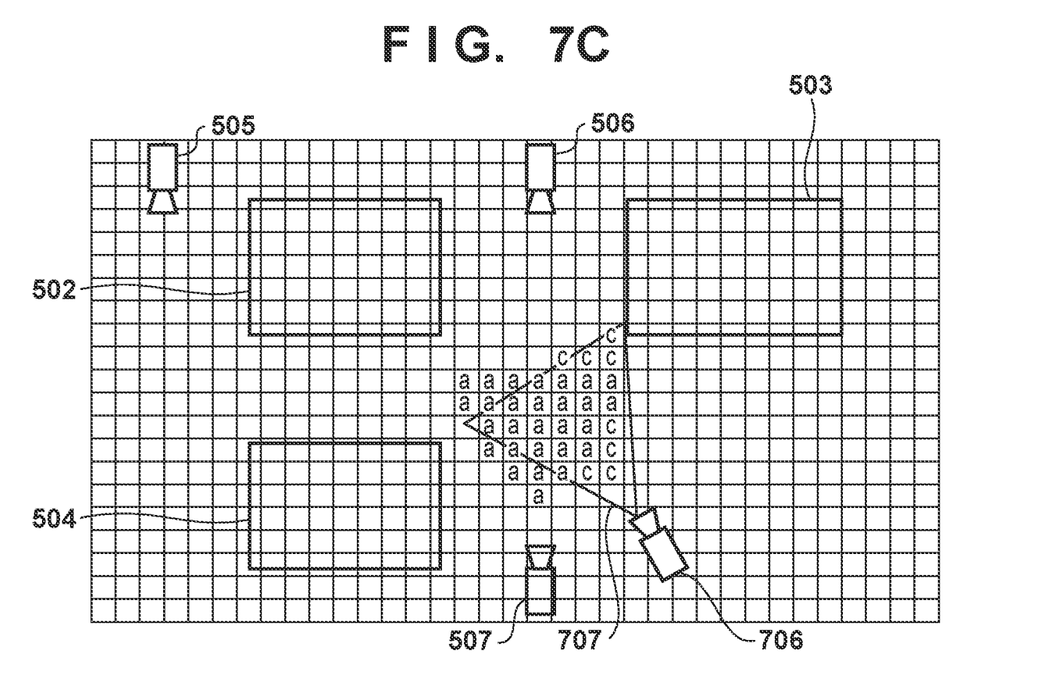
FIG. 7C is a diagram illustrating advantages of the first embodiment.

Even in the case where the imaging range of any of the image capturing devices 101 to 103 changes, or the case where a new image capturing device is added, the system according to the present embodiment can collect information for object region correction more easily than in conventional technology, and this will be described below with reference to FIGS. 7A to 7C. In FIGS. 7A to 7C, members that are the same as in FIG. 5 are denoted by the same reference signs.

In FIG. 7A, the letter "a" indicates blocks that belong to an imaging range 702 of the image capturing device 507. Here, it is assumed that light source information has been registered in the storage unit 307 for the blocks indicated by "a" (called blocks a).

Here, it is assumed that, as shown in FIG. 7B, the image capturing device 507 pans in the horizontal direction, and the imaging range of the image capturing device 507 changes from the imaging range 702 to an imaging range 704. If the imaging range of the image capturing device 507 has changed from the imaging range 702 to the imaging range 704, light source information needs to be collected for the blocks that belong to the imaging range 704 that is the imaging range after the change. Here, light source information has already been registered for the blocks (blocks a) in the imaging range 704 that are overlapped with blocks in the imaging range 702, and therefore light source information does not need to be estimated again for these blocks. In view of this, it is sufficient to obtain and register light source information for the blocks in the imaging range 704 that are not overlapped with blocks in the imaging range 702 (i.e., the blocks indicated by "b" (called blocks b)).

Also, it is assumed that, as shown in FIG. 7C, the image capturing device 706 is added in addition to the image capturing devices 505 to 507. Depending on the positional relationship and imaging direction relationship between the added image capturing device and the already-installed image capturing devices, there is a possibility that the imaging range of the added image capturing device is partially or entirely overlapped with the imaging ranges of the other image capturing devices. In the case of FIG. 7C, part of an imaging range 707 of the added image capturing device 706 is overlapped with the imaging range 702 of the image capturing device 507 that is installed in the vicinity of the image capturing device 706 (i.e., some blocks a are included in the imaging range 707). Accordingly, in this case, light source information for blocks a obtained for the image capturing device 507 is used as light source information for blocks a that correspond to the imaging range 707. Also, light source information is obtained and registered for blocks in the imaging range 707 that are not included in the imaging range 702 (blocks indicated by "c").

In general, when an image capturing device is added, an adjacent image capturing device installed adjacent to the added image capturing device is specified. In this case, a correspondence table storing the installation position and identification information of an image capturing device in correspondence with each other needs to be created for each image capturing device and registered in the image correction device 105, and the identification information of the adjacent image capturing device that is installed at the installation position closest to the installation position of the added image capturing device is specified. When the imaging range of the added image capturing device includes an overlapping portion that is overlapped with the imaging range of the adjacent image capturing device, light source information that has been registered for blocks in the imaging range of the adjacent image capturing device that correspond to the overlapping portion are employed as light source information for the blocks in the overlapping portion. As described above, light source information is obtained for the blocks in the imaging range of the added image capturing device that are not in the overlapping portion.

In this way, light source information is registered in correspondence with positions on the map, and therefore even if the imaging range of a image capturing device changes, or a new image capturing device is added, it is possible to utilize already-obtained light source information and minimize light source estimation processing.

Also, if the position coordinates in the light source map information are expanded to three dimensions, and a time axis is added, it is also possible to handle a change in illumination conditions that occurs over time. For example, assume that the time axis corresponds to a 24-hour period, the flowchart of FIG. 4 is performed at intervals of one hour, and light source map information for each one hour period is generated for each image capturing device. In the processing corresponding to the flowchart of FIG. 6, light source information that corresponds to the position of the object region on the map and a designated time is acquired.

In this way, according to the present embodiment, by referencing the light source map information, it is possible to correctly perform correction of color information of an object region without requiring a waiting time in accordance with a change in illumination conditions that accompanies movement of an object. Also, even if the imaging range of an image capturing device changes, or an image capturing device is added, there is no need to again perform processing for estimating light source information necessary for correction.

Variations

Although it is described that the image capturing devices and the image correction device 105 are separate devices in the first embodiment, the image correction device 105 may be implemented in each of the image capturing devices 101 to 103. In this case, for example, in the image capturing device 101, light source map information that corresponds to the image capturing device 101 is generated and held, and thereafter when imaging is started in the image capturing device 101, an object region in a captured image is corrected with use of the held light source map information. The image capturing device 101 then transmits the captured image that includes the corrected object region to the monitoring device 106 via the network 104.

Note that it is not required that all of the configurations of the image correction device 105 are incorporated in the image capturing device, and a portion of the configurations of the image correction device 105 may be incorporated in the image capturing device. For example, a configuration is possible in which, among the functions of the image correction device 105, the function for detecting an object region in a captured image is incorporated in the image capturing device. In this case, the image capturing device transmits the detected object region to the image correction device 105, and the image correction device 105 performs correction processing on the received object region.

Second Embodiment

Figure 3:
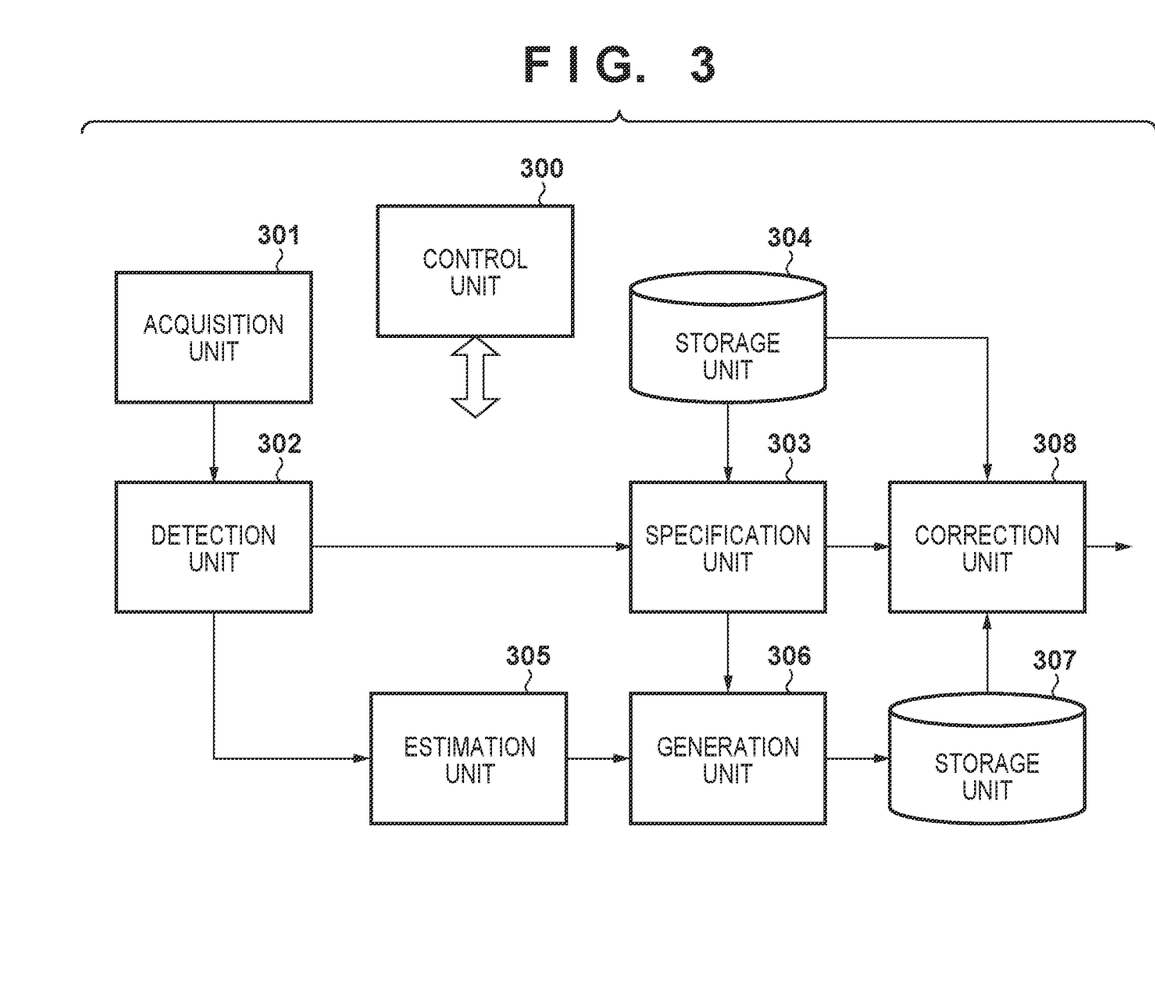
FIG. 3 is a block diagram showing an example of a function configuration of an image correction device 105.

All of the function units shown in FIG. 3 may be implemented by hardware, and a configuration is possible in which the storage units 304 and 307 are implemented by a memory, and the remaining function units are implemented by software (computer programs). In the latter case, a computer device that has a memory that functions as the storage units 304 and 307, and that can execute computer programs that correspond to the remaining function units can be applied to the image correction device 105.

Figure 2:
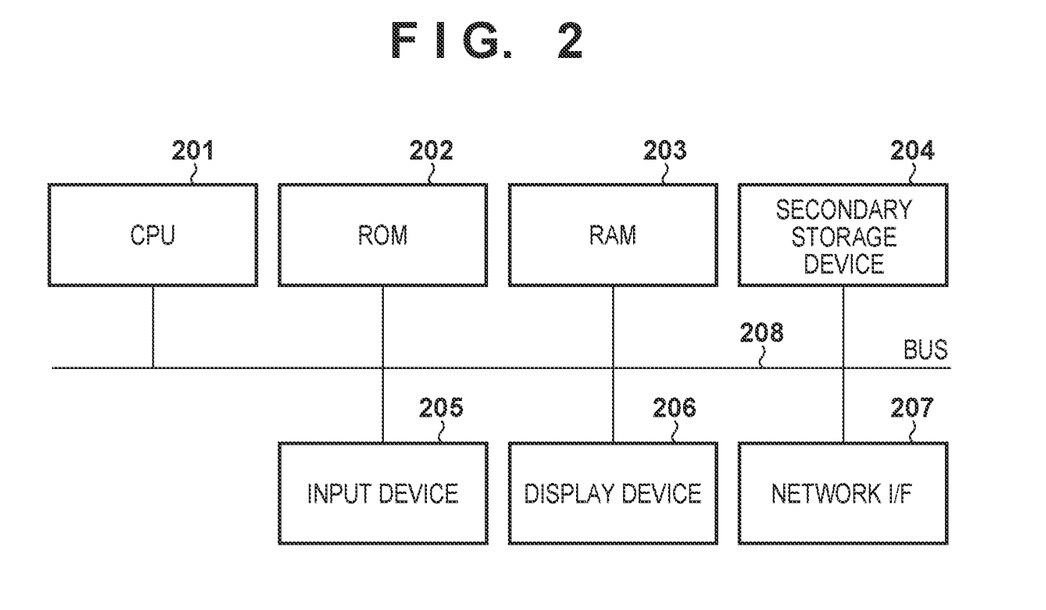
FIG. 2 is a block diagram showing an example of a hardware configuration of a computer device.

An example of the hardware configuration of a computer device applicable to the image correction device 105 will be described below with reference to the block diagram of FIG. 2. Note that the computer device having the hardware configuration example shown in FIG. 2 may be applied to the monitoring device 106 as well.

A CPU 201 executes processing with use of computer programs and data that are stored in a ROM 202 and a RAM 203. Accordingly, the CPU 201 controls overall operation of the computer device, and also executes or controls the above-described processing steps that are considered to be performed by the image correction device 105.

The ROM 202 stores data and a computer program that does not need to be rewritten, such as a BIOS. The RAM 203 has an area for storing computer programs and data that are loaded from the ROM 202 or a secondary storage device 204, and storing data received from the outside (e.g., from the image capturing devices 101 to 103) via a network I/F 207. The RAM 203 also has a work area that is used when the CPU 201 executes various types of processing. In this way, the RAM 203 can appropriately provide various types of areas.

The secondary storage device 204 is a high-capacity information storage device typified by a hard disk drive apparatus or a flash memory. The secondary storage device 204 stores an OS (Operating System) and computer programs and data for causing the CPU 201 to execute or control the above-described processing steps that are considered to be performed by the image correction device 105. The computer programs stored in the secondary storage device 204 include a computer program for causing the CPU 201 to execute or control the functions of function units other than the storage units 304 and 307 in FIG. 3. Also, the data stored in the secondary storage device 204 includes data that was described as known information in the above description. Note that the storage units 304 and 307 can be implemented by any one of or a combination of the RAM 203, the ROM 202, and the secondary storage device 204. The computer programs and data stored in the secondary storage device 204 are loaded to the RAM 203 as necessary in accordance with control performed by the CPU 201, and are the subject of processing performed by the CPU 201.

An input device 205 is constituted by a user interface such as a keyboard or a mouse, and enables the input of various types of instructions to the CPU 201 by being operated by a user.

A display device 206 is constituted by a CRT, a liquid crystal display, or the like, and can display the results of processing performed by the CPU 201 with use of images, text, and the like. For example, if this computer device is applied to the monitoring device 106, a captured image that includes an object region corrected by the image correction device 105 is displayed on the display device 206. Also, the input device 205 and the display device 206 may be combined to constitute a touch panel screen. Furthermore, the display device 206 may be a projector that projects a display target image.

The network I/F 207 is for connecting the computer device to the network 104, and the computer device performs data communication with external device such as the image capturing devices 101 to 103 via the network I/F 207.

The CPU 201, the ROM 202, RAM 203, the secondary storage device 204, the input device 205, the display device 206, and the network I/F 207 are all connected to a bus 208. Note that the hardware configuration example shown in FIG. 2 is one example of the hardware configuration of a computer device that can be applied to the image correction device 105 or the monitoring device 106, and there is no limitation to this configuration.

According to the embodiments described above, it is possible to more swiftly collect light source information for use when correcting color information of an object region in a captured image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-081439, filed Apr. 17, 2017, which is hereby incorporated by reference herein in its entirety.

What is claimed is:

1. An image processing apparatus comprising a computer executing instructions that, when executed by the computer, cause the computer to function as:

a holding unit configured to hold plural pieces of information in which positions in a map of a monitoring area that is monitored by an image capturing unit, light source information relating to a light source, and times of image capture performed by the image capturing unit are associated with each other;

an acquisition unit configured to acquire, from the holding unit, a position among the positions in the map, a corresponding time, which corresponds to the position, among the times of image capture, and light source information that are associated with the acquired position and the corresponding time; and a correction unit configured to correct color information of a region including an object in the captured image based on the light source information acquired by the acquisition unit.

2. The image processing apparatus according to claim 1, wherein the instructions further cause the computer to function as:

an estimation unit configured to estimate a light source for each position in the map based on the captured image; and a registration unit configured to register, in the holding unit, the information in which the light source information relating to the light source estimated by the estimation unit, the position in the map, and the corresponding time of image capture performed by the image capturing unit are associated with each other.

3. The image processing apparatus according to claim 2, wherein the instructions further cause the computer to function as:

a communication unit configured to communicate with a plurality of image capturing units, wherein for each of the plurality of image capturing units, the estimation unit estimates the light source based on captured images, and for each of the plurality of image capturing units, the registration unit registers, in the holding unit, the information in which the position in the map, the light source information relating to the light source estimated by the estimation unit, and the corresponding time of image capture performed by the image capturing unit are associated with each other.

4. The image processing apparatus according to claim 3, wherein in a case where an imaging range of the image capturing unit was changed, the estimation unit estimates a light source for only a region of a post-change imaging range that is not overlapped with a pre-change imaging range.

5. The image processing apparatus according to claim 2, wherein in a case where a new image capturing unit is added, the estimation unit estimates a light source for only a region of an imaging range of the added image capturing unit that is not overlapped with an imaging range of an image capturing unit that is adjacent to the added image capturing unit.

6. The image processing apparatus according to claim 1, wherein the position in the map is a position on the map of the monitoring area that is monitored by the image capturing unit that captured the captured image.

7. The image processing apparatus according to claim 1, wherein the light source information includes a color temperature that indicates a color of light.

8. The image processing apparatus according to claim 1, wherein the light source information includes a white point position in a color difference space.

9. The image processing apparatus according to claim 1, wherein the acquisition unit acquires the position in the map of the object included in the captured image.

10. An image processing method performed by an image processing apparatus, the image processing method comprising:

holding, in a memory, plural pieces of information in which positions in a map of a monitoring area that is monitored by an image capturing unit, light source information relating to a light source, and times of image capture performed by the image capturing unit are associated with each other;

acquiring, from the memory, a position among the positions in the map and a corresponding time, which corresponds to the position, among the times of image capture, and light source information that are associated with the acquired position and the corresponding time; and correcting color information of a region including an object in the captured image based on the acquired light source information.

11. A non-transitory computer-readable storage medium storing a program for causing a computer to perform operations comprising:

holding, in a memory, plural pieces of information in which positions in a map of a monitoring area that is monitored by an image capturing unit, light source information relating to a light source, and times of image capture performed by the image capturing unit are associated with each other;

acquiring, from the memory, a position among the positions in the map, a corresponding time, which corresponds to the position, among the positions of image capture, and light source information that are associated with the acquired position and the corresponding time; and correcting color information of a region including an object in the captured image based on the acquired light source information.

12. An image processing apparatus comprising a computer executing instructions that, when executed by the computer, cause the computer to function as:

a holding unit configured to hold plural pieces of information in which positions in a map of a monitoring area that is monitored by an image capturing unit and light source information relating to a light source are associated with each other;

an acquisition unit configured to acquire a corresponding position among the positions in the map, and light source information that are associated with the acquired corresponding position from the holding unit;

a correction unit configured to correct color information of a region including an object in the captured image based on the light source information acquired by the acquisition unit;

a communication unit configured to communicate with a plurality of image capturing units;

for each of the plurality of image capturing units, an estimation unit configured to estimate a light source for each corresponding position in the map based on captured images; and for each of the plurality of image capturing units, a registration unit configured to register, in the holding unit, the information in which the light source information relating to the light source estimated by the estimation unit and the corresponding position in the map are associated with each other.

13. An image processing method performed by an image processing apparatus, the image processing method comprising:

holding, in a memory, plural pieces of information in which positions in a map of a monitoring area that is monitored by an image capturing unit and light source information relating to a light source are associated with each other;

acquiring a corresponding position among the positions in the map and light source information that are associated with the acquired corresponding position from the memory;

correcting color information of a region including an object in the captured image based on the acquired light source information;

communicating with a plurality of image capturing units;

for each of the plurality of image capturing units, estimating a light source for each corresponding position in the map based on captured images; and for each of the plurality of image capturing units, registering, in the memory, the information in which the light source information relating to the estimated light source and the corresponding position in the map are associated with each other.

14. A non-transitory computer-readable storage medium storing a program for causing a computer to perform operations comprising:

holding, in a memory, plural pieces of information in which positions in a map of a monitoring area that is monitored by an image capturing unit and light source information relating to a light source are associated with each other;

acquiring a corresponding position among the positions in the map and light source information that are associated with the acquired corresponding position from the memory;

correcting color information of a region including an object in the captured image based on the acquired light source information;

communicating with a plurality of image capturing units;

for each of the plurality of image capturing units, estimating a light source for each corresponding position in the map based on captured images; and for each of the plurality of image capturing units, registering, in the memory, the information in which the light source information relating to the estimated light source and the corresponding position in the map are associated with each other.

\* \* \* \* \*